(12) United States Patent
Kakuda et al.

(10) Patent No.: US 10,947,426 B2
(45) Date of Patent: *Mar. 16, 2021

(54) AQUEOUS BONDING COMPOSITION

(71) Applicant: HENKEL AG & CO. KGAA, Duesseldorf (DE)

(72) Inventors: Atsushi Kakuda, Osaka (JP); Yoshio Yoshida, Osaka (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,185

(22) Filed: Jan. 30, 2018

(65) Prior Publication Data

US 2018/0155583 A1 Jun. 7, 2018

Related U.S. Application Data

(63) Continuation of application No. PCT/JP2016/003546, filed on Aug. 2, 2016.

(30) Foreign Application Priority Data

Aug. 5, 2015 (JP) .............................. JP2015-154776

(51) Int. Cl.
| | | |
|---|---|---|
| C09J 105/00 | (2006.01) | |
| C08L 97/02 | (2006.01) | |
| C09D 105/00 | (2006.01) | |
| B32B 21/04 | (2006.01) | |
| C08K 3/16 | (2006.01) | |
| C08K 3/30 | (2006.01) | |
| C08K 3/32 | (2006.01) | |
| C13K 11/00 | (2006.01) | |

(52) U.S. Cl.
CPC ........... C09J 105/00 (2013.01); B32B 21/042 (2013.01); C08K 3/16 (2013.01); C08K 3/30 (2013.01); C08K 3/32 (2013.01); C08L 97/02 (2013.01); C09D 105/00 (2013.01); C13K 11/00 (2013.01); C08K 2003/166 (2013.01); C08K 2003/3054 (2013.01); C08K 2003/322 (2013.01); C09J 2203/00 (2013.01)

(58) Field of Classification Search
None
See application file for complete search history.

(56) References Cited

U.S. PATENT DOCUMENTS

| | | | | |
|---|---|---|---|---|
| 4,183,997 | A * | 1/1980 | Stofko | B27D 1/04 |
| | | | | 428/326 |
| 4,382,884 | A | 5/1983 | Rohringer et al. | |
| 5,405,366 | A * | 4/1995 | Fox | A61K 9/0014 |
| | | | | 424/443 |
| 5,547,745 | A * | 8/1996 | Hansen | A61L 15/60 |
| | | | | 442/417 |
| 6,461,553 | B1 | 10/2002 | Hansen et al. | |
| 6,982,049 | B1 | 1/2006 | Mabey et al. | |
| 2005/0040251 | A1* | 2/2005 | Daly | C09K 5/10 |
| | | | | 237/81 |
| 2011/0086567 | A1* | 4/2011 | Hawkins | C08K 5/17 |
| | | | | 442/327 |
| 2013/0082205 | A1* | 4/2013 | Mueller | E04B 1/78 |
| | | | | 252/62 |
| 2013/0127085 | A1* | 5/2013 | Kalbe | C09D 105/00 |
| | | | | 264/134 |
| 2017/0057118 | A1* | 3/2017 | Ozyhar | B27N 3/08 |

FOREIGN PATENT DOCUMENTS

| | | | |
|---|---|---|---|
| CN | 101864091 A | | 10/2010 |
| GB | 2451719 A | | 2/2009 |
| JP | 56-500414 A | | 12/1981 |
| JP | WO2015072437 | * | 5/2015 |
| WO | 2009010393 A1 | | 1/2009 |
| WO | 2010001988 A1 | | 1/2010 |
| WO | 2012133219 A1 | | 10/2012 |
| WO | 2015072437 A1 | | 5/2015 |

* cited by examiner

*Primary Examiner* — Colin W. Slifka
(74) *Attorney, Agent, or Firm* — Sun Hee Lehmann

(57) ABSTRACT

Disclosed is an aqueous bonding composition comprises: (A) a saccharide; (B) an inorganic acid ammonium salt; and (C) a metal salt, wherein the metal salt (C) comprises at least one selected from potassium salts, calcium salts, sodium salts, and magnesium salts. The aqueous bonding composition is excellent in balance among bending strength, bending strength under wet condition, water-absorption thickness expansion coefficient, and peeling strength. The aqueous bonding composition can be usefully used to produce a wood-based material. Further, a wood-based material obtainable by using the aqueous bonding composition is provided.

8 Claims, No Drawings

AQUEOUS BONDING COMPOSITION

CROSS-REFERENCE TO RELATED APPLICATIONS

This application is a continuation of International Application No. PCT/JP2016/003546 filed Aug. 2, 2016, which claims the benefit of Japanese Patent Application No. 2015-154776 filed on Aug. 5, 2015, the contents of both of which are incorporated herein by reference.

TECHNICAL FIELD OF THE INVENTION

The present invention relates to an aqueous bonding composition capable of producing an aqueous adhesive, and a wood-based material which is producible by using the aqueous bonding composition.

BACKGROUND OF THE INVENTION

Wood-based materials (for example, plywoods (veneer board, etc.), particle boards, fiber boards (medium density fiber board MDF, etc.), and laminated woods) are generally produced by applying or spraying an adhesive onto wood-based elements (raw materials) (for example, various sizes of fibers, small pieces, and veneers obtained by finely dividing woods or herbaceous plants), followed by optional molding through pressurizing and heating. The wood-based materials are natural regenerable materials and are materials in which size and stability of strength are enhanced and thus defects peculiar to woods are removed while utilizing advantages of woods. An aqueous adhesive, which does not cause diffusion of formaldehyde and contains no organic solvent, have been developed as the adhesive to be used from the viewpoint of the protection of the earth environment, and the protection of workers producing wood-based materials.

When a wood-based material (for example, particle board) is produced using a urea resin, a phenol resin and so on, a mixture of a wood-based element with an adhesive is generally heated to a temperature in a range of about 130 to 170° C. and then molded. Therefore, it is preferable that the aqueous adhesive is also heated to approximately the same temperature, and thus which makes it possible to produce the wood-based material. However, when using the aqueous adhesive, a higher temperature is often needed.

There is also a need that the wood-based material thus obtained (for example, particle board) is excellent in properties such as bending strength, bending strength under wet condition, water-absorption thickness expansion coefficient, and peeling strength. However, when using the aqueous adhesive, the properties are often unsatisfactory.

JP 56-500414 A discloses an aqueous solution comprising a starch (wheat flour, etc.) and a saccharide (sucrose, molasses, etc.), and a catalyst (ammonium chloride, zinc chloride, aluminum chloride, ammonium sulfate, ammonium nitrate, diammonium phosphate, etc.) capable of converting them, so as to joint woods (see Examples of JP 56-500414 A).

JP 56-500414 A teaches that anhydrous aluminum chloride may be a catalyst capable of lowering a heating temperature. The patent document discloses that a particle mat can be obtained at a press temperature of 175° C. to 190° C. when using the aluminum chloride, and that thickness expansion is in a range of about 3 to 10% (see Tables 1 and 2 of Examples of JP 56-500414 A). However, the aluminum chloride is not suitable since it has corrosiveness to human bodies and vigorously reacts with water to generate hydrogen chloride, leading to emission of an irritant odor.

WO 2010/001988 A1 discloses an adhesive comprising a saccharide (sucrose, etc.) and a polycarboxylic acid (citric acid, etc.), so as to joint woods. Inclusion of the polycarboxylic acid improves the joint power between woods. However, the temperature in producing a wood-based material is as high as 200° C. Furthermore, a water-absorption thickness expansion coefficient is as large as about 25% (see Test 2 in Table 10 of WO 2010/001988 A1).

WO 2012/133219 A1 discloses an adhesive comprising a saccharide (sucrose, maltose, etc.) and a polycarboxylic acid (citric acid, malic acid, maleic anhydride, polymaleric acid, polyacrylic acid, etc.), so as to joint woods. Inclusion of the polycarboxylic acid improves the joint power between the woods. However, the temperature in producing a wood-based material by molding is as high as 180 to 200° C. Addition of a furan compound enables decrease in manufacturing temperature and also decrease in water-absorption thickness expansion coefficient, however, the performances such as bending strength, bending strength under wet condition, and peeling strength, as well as balance among them are unsatisfactory (see Tables 2 to 7 of WO 2012/133219 A1).

Therefore, an aqueous adhesive is required, as an aqueous adhesive used to produce a wood-based material, which adhesive is excellent in performances such as bending strength, bending strength under wet condition, water-absorption thickness expansion coefficient, and peeling strength and is also excellent in balance among them while being capable of bonding at a comparatively low temperature.

JP 56-500414 A
WO 2010/001988 A1
WO 2012/133219 A1

SUMMARY OF THE INVENTION

In light of these circumstances, the present invention has been made and an object thereof is to provide an aqueous bonding composition which is excellent in balance among performances such as bending strength, bending strength under wet condition, water-absorption thickness expansion coefficient, and peeling strength while being capable of bonding at a comparatively low temperature, and which is particularly useful to produce a wood-based material. Further, an object of the present invention is to provide a wood-based material which is obtainable by using the aqueous bonding composition.

As a result of continued intensive study, the present inventors have found that an aqueous bonding composition comprising a saccharide, an ammonium salt of an inorganic acid, at least one selected from specific alkali metal salts and alkali earth metal salts is excellent in balance among properties such as bending strength, bending strength under wet condition, water-absorption thickness expansion coefficient, and peeling strength while being capable of bonding at a comparatively low temperature, and which is particularly useful to produce a wood-based material, thus completing the present invention.

The present invention provides, in an aspect, an aqueous bonding composition comprising:
(A) a saccharide; (B) an inorganic acid ammonium salt; and (C) a metal salt,
wherein the metal salt (C) comprises at least one selected from potassium salts, calcium salts, sodium salts, and magnesium salts.

The present invention provides, in an embodiment, an aqueous bonding composition, wherein the metal salt (C) is a strong acid salt.

The present invention provides, in another embodiment, an aqueous bonding composition, wherein the metal salt (C) comprises magnesium chloride.

The present invention provides, in a further embodiment, an aqueous bonding composition, wherein the saccharide (A) comprises a structure derived from fructose.

The present invention provides, in a preferred embodiment, an aqueous bonding composition, wherein the inorganic acid ammonium salt (B) comprises at least one selected from ammonium hydrogen phosphate, ammonium dihydrogen phosphate, ammonium sulfate, and ammonium chloride.

The present invention provides an aqueous bonding composition, wherein the metal salt (C) is included in an amount of 2.0 parts by weight or more based on 100 parts by weight of the total weight of the components (A) to (C).

The present invention provides, in another aspect, a wood-based material which is obtainable by using the aqueous bonding composition.

The aqueous bonding composition according to the embodiments of the present invention comprises (A) a saccharide, (B) an inorganic acid ammonium salt, and (C) a metal salt comprising at least one selected from potassium salts, calcium salts, sodium salts, and magnesium salts, and is therefore excellent in balance among properties such as bending strength, bending strength under wet condition, water-absorption thickness expansion coefficient, and peeling strength while being capable of bonding at a comparatively low temperature, and is particularly useful to produce a wood-based material.

DETAILED DESCRIPTION OF THE INVENTION

The aqueous bonding composition of the embodiments of the present invention comprises (A) a saccharide, (B) an inorganic acid ammonium salt, and (C) a metal salt, and the metal salt (C) comprises at least one selected from potassium salts, calcium salts, sodium salts, and magnesium salts.

In the present invention, the "(A) saccharide" is generally called a saccharide and is not particularly limited as long as the objective aqueous bonding composition of the present invention is obtainable. The saccharide (A) comprises, for example, monosaccharide, disaccharide, trisaccharide, tetrasaccharide, polysaccharide, and other oligosaccharides.

Specific examples of the "monosaccharide" include the followings:

hexoses such as glucose, psicose, fructose, sorbose, tagatose, allose, altrose, mannose, gulose, idose, galactose, talose, fucose, fuculose, and rhamnose;

trioses such as ketotriose (dihydroxyacetone) and aldotriose (glyceraldehyde);

tetroses such as erythrulose, erythrose, and threose; and pentoses such as ribulose, xylulose, ribose, arabinose, xylose, lixose, and deoxyribose.

Examples of the "disaccharide" include sucrose, lactose, maltose, trehalose, turanose, and cellobiose.

Examples of the "trisaccharide" includes raffinose, melezitose, maltotriose, and 1-kestose (GF2).

Examples of the "tetrasaccharide" include acarbose, stachyose, and nystose (GF3).

Examples of the "polysaccharide" include glycogen, starch (amylose, amylopectin, etc.), cellulose, dextrin, glucan, N-acetylglucosamine, chitin, and inulin (including fructofuranosylnystose: GF4).

Examples of the "other oligosaccharides" include fructooligosaccharide, galactooligosaccharide, and mannan oligosaccharide.

These "saccharide(s)" can be used alone or in combination.

The "saccharide" preferably comprises a structure derived from fructose. Examples of the saccharide can include fructose itself, sucrose, and inulin.

Inulin usually refers to a polymer of fructose, including glucose linked to the end. Therefore, insulin includes, for example, 1-kestose (GF2) included in the simplest trisaccharide, nystose (GF3) included in the tetrasaccharide, fructofuranosylnystose (GF4) included in the polysaccharide, and the like. The 1-kestose is composed of two fructoses and one glucose, while the nystose is composed of three fructoses and one glucose.

When the "saccharide" comprises a structure derived from fructose, the aqueous bonding composition of the present invention is more excellent in water resistance. Therefore, regarding the wood-based material of the present invention, the bending strength under wet condition can further increase and the water-absorption thickness expansion coefficient can further decrease.

It is possible to use, as the "saccharide", commercially available products.

In the present invention, the "(B) inorganic acid ammonium salt" is generally called an ammonium salt of an inorganic acid and is not particularly limited as long as the objective aqueous bonding composition of the present invention is obtainable.

Examples of the "inorganic acid ammonium salt" can include ammonium sulfate, ammonium hydrogen sulfate, ammonium halide (for example, ammonium chloride, ammonium fluoride, ammonium bromide, ammonium iodide, etc.), ammonium phosphate, ammonium hydrogen phosphate, and ammonium dihydrogen phosphate.

The "inorganic acid ammonium salt" is preferably at least one selected from ammonium sulfate, ammonium chloride, ammonium hydrogen phosphate, and ammonium dihydrogen phosphate.

When the "(B) inorganic acid ammonium salt" is at least one selected from ammonium sulfate, ammonium chloride, ammonium hydrogen phosphate, and ammonium dihydrogen phosphate, the aqueous bonding composition of the present invention has more excellent curability, thus making it possible to further improve bonding properties (bending strength and peeling strength) of the wood-based material.

The "inorganic acid ammonium salt(s)" can be used alone or in combination.

It is possible to use, as the "inorganic acid ammonium salt", commercially available products.

In the present invention, the "(C) metal salt" comprises at least one selected from potassium salts, calcium salts, sodium salts, and magnesium salts.

Examples of the metal salt (C) include:

potassium salts such as potassium sulfate, potassium hydrogen sulfate, potassium halide (for example, potassium fluoride, potassium chloride, potassium bromide, and potassium iodide), potassium phosphate, potassium hydrogen phosphate, and potassium dihydrogen phosphate;

calcium salts such as calcium sulfate, calcium hydrogen sulfate, calcium halide (for example, calcium fluoride, calcium chloride, calcium bromide, and calcium iodide), calcium phosphate, calcium hydrogen phosphate, and calcium dihydrogen phosphate;

sodium salts such as sodium sulfate, sodium hydrogen sulfate, sodium halide (for example, sodium fluoride, sodium chloride, sodium bromide, and sodium iodide), sodium phosphate, sodium hydrogen phosphate, and sodium dihydrogen phosphate; and magnesium salts such as magnesium sulfate, magnesium hydrogen sulfate, magnesium halide (for example, magnesium fluoride, magnesium chloride, magnesium bromide, and magnesium iodide), magnesium phosphate, magnesium hydrogen phosphate, and magnesium dihydrogen phosphate.

The metal salt (C) is preferably at least one selected from potassium sulfate, potassium hydrogen sulfate, potassium chloride, potassium hydrogen phosphate, and potassium dihydrogen phosphate;

calcium sulfate, potassium hydrogen sulfate, calcium chloride, calcium hydrogen phosphate, and calcium dihydrogen phosphate;

sodium sulfate, sodium hydrogen sulfate, sodium chloride, sodium hydrogen phosphate, and sodium dihydrogen phosphate; and magnesium sulfate, magnesium hydrogen sulfate, magnesium chloride, magnesium hydrogen phosphate, and magnesium dihydrogen phosphate.

The metal salt (C) is preferably a metal salt of strong acid, and more preferably a metal salt of sulfuric acid and a metal halide. When the metal salt (C) is a metal salt of strong acid, a wood-based material produced by using the aqueous bonding composition of the present invention can be cured by heating and pressurizing at a lower temperature for a shorter time.

The metal salt (C) is particularly preferably at least one selected from potassium sulfate, potassium chloride, calcium sulfate, calcium chloride, sodium sulfate, sodium chloride, magnesium sulfate, and magnesium chloride. When the metal salt (C) is at least one selected from potassium sulfate, potassium chloride, calcium sulfate, calcium chloride, sodium sulfate, sodium chloride, magnesium sulfate, and magnesium chloride, a wood-based material produced by using the aqueous bonding composition of the present invention can be cured by heating and pressurizing at a lower temperature for a shorter time, and thus may exhibit a lower water-absorption thickness expansion coefficient and a higher bending strength under wet condition.

The metal salt (C) comprises magnesium chloride, most preferably. When the metal salt (C) comprises magnesium chloride, the wood-based material of the present invention can be cured by heating and pressurizing at a lower temperature for a shorter time, and thus may exhibit a lower water-absorption thickness expansion coefficient and a higher bending strength under wet condition.

These metal salt(s) (C) can be used alone or in combination.

It is possible to use, as the metal salt (C), commercially available products.

Each amount of the components (A) to (C) is not particularly limited as long as the objective aqueous bonding composition of the present invention is obtainable.

The component (A) is preferably included in an amount of 20 to 95 parts by weight, more preferably 50 to 90 parts by weight, and particularly preferably 60 to 85 parts by weight, based on 100 parts by weight of the total amount of the components (A) to (C).

The component (B) is preferably included in an amount 1 to 50 parts by weight, more preferably 3 to 35 parts by weight, and particularly preferably 5 to 25 parts by weight, based on 100 parts by weight of the total amount of the components (A) to (C).

The component (C) is preferably included in an amount of 0.5 to 50 parts by weight, more preferably 1 to 25 parts by weight, and particularly preferably 2 to 15 parts by weight, based on 100 parts by weight of the total amount of the components (A) to (C).

If the component (A) is included in an amount of 20 to 95 parts by weight, the wood-based material produced by using the aqueous bonding composition of the present invention can have more excellent bending strength under wet condition and water-absorption thickness expansion coefficient.

If the component (B) is included in an amount of 1 to 50 parts by weight, curability of the aqueous bonding composition of the present invention is improved, so that the wood-based material can be cured by heating and pressurizing at a lower temperature for a shorter time.

If the component (C) is included in an amount of 0.5 to 50 parts by weight, the wood-based material of the present invention can be more excellent in low-temperature curability.

The aqueous bonding composition according to the present invention comprises water, and has a form of an aqueous solution in which all of the above-mentioned components (A) to (C) are dissolved in water, or a form of a dispersion in which at least one of the above-mentioned components (A) to (C) is dispersed without being dissolved in water.

The "water" as used herein is generally called "water" and is not particularly limited as long as the objective aqueous bonding composition of the present invention is obtainable. Examples thereof can include distilled water, deionized water, pure water, tap water, and industrial water.

The amount of water contained in the aqueous bonding composition according to the embodiment of the present invention is not particularly limited as long as the objective aqueous bonding composition of the present invention is obtainable, and is appropriately selected considering the components (A) to (C) to be used and additives.

The aqueous bonding composition according to the embodiments of the present invention preferably includes water in an amount of 10 to 90 parts by weight, more preferably 20 to 80 parts by weight, and particularly preferably 30 to 60 parts by weight, based on 100 parts by weight of the total amount of the components (A) to (C).

The aqueous bonding composition according to the present invention is in a form of an aqueous solution or a water dispersion, so that it is easy to apply or spray onto an adherend. Furthermore, the aqueous bonding composition according to the present invention is excellent in protection of the earth environment, and protection of a work environment of workers because an organic solvent is not preferably used.

The aqueous bonding composition according to the embodiments of the present invention can comprise other components. Examples of the components can comprise a thickener, a preservative, a mildew-proofing agent, a rust preventive, and a dispersion stabilizer.

The thickener is used to prevent a viscosity of the composition from decreasing in the case of pressurizing and heating, and is not particularly limited as long as the objective aqueous bonding composition of the present invention is obtainable. The thickener is classified, for example, into an organic thickener and an inorganic thickener.

Examples of the inorganic thickener can include clay, talc, and silica.

Examples of the organic thickener can include carboxymethyl cellulose, polyvinyl alcohol, and vegetable flours such as wheat flour, cornstarch, top-grade rice flour, walnut flour, and coconut flour.

These thickeners can be used alone or in combination.

The aqueous bonding composition according to the embodiments of the present invention can be produced by mixing the above-mentioned components (A) to (C), and optional other components and water, followed by stirring. The order of mixing the respective components (A) to (C), water, and the other components, the mixing method, and the stirring method are not particularly limited as long as the objective aqueous bonding composition of the present invention is obtainable.

The wood-based material according to the present invention is produced by applying or spraying the aqueous bonding composition according to the embodiments of the present invention onto a wood-based element (raw material) (for example, fibers of wood-based or herbaceous plants, small pieces and veneers, etc.), heating the wood-based element to bond and mold the wood-based element.

Examples of the wood-based element (raw material) include those obtained by grinding woods, for example, sawn boards, veneers, wood-based strands, wood-based chips, wood-based fibers and vegetable fibers, and the like.

Examples of the wood-based material include those obtained by bonding the wood-based element using an adhesive, for example, laminated woods, plywoods, particle boards, fiber boards, MDF, and the like.

The aqueous bonding composition according to the embodiments of the present invention can be used to bond various adherends (for example, papers, wood-based fibers, plywoods, etc.), and can be suitably used to produce the above-mentioned wood-based material.

In the case of producing the wood-based material by molding, manufacturing condition such as coating amount of the aqueous bonding composition, coating method, molding pressure, molding temperature, and molding time are appropriately selected according to the type, shape, and size of the wood-based element, the size of the wood-based material to be produced, and are not particularly limited as long as the objective wood-based material of the present invention is obtainable.

The coating amount of the aqueous bonding composition is preferably in a range of 5 to 80 parts by weight, more preferably 10 to 60 parts by weight, and particularly preferably 20 to 40 parts by weight, based on 100 parts by weight of a dried wood-based element.

The coating method of the aqueous bonding composition is preferably a coating method using a roll and a brush, a spraying method using a spray, a method of impregnating with the aqueous bonding composition, or the like.

The molding pressure is preferably in a range of 0.5 to 6.0 MPa. If the molding pressure is 6.0 MPa or less, the wood-based material is scarcely degraded since too large pressure is not applied. If the molding pressure is 0.5 MPa or more, it is possible to satisfactorily bond the wood-based element.

The molding temperature is preferably in a range of 140 to 230° C., more preferably 140 to 200° C., and particularly preferably 140 to 170° C. If the molding temperature is 230° C. or lower, low energy consumption is achieved because of non-excessive temperature, and also the wood-based material is scarcely degraded. If the molding temperature is 140° C. or higher, the bonding can proceed within an appropriate time.

The molding time is preferably in a range of 3 to 10 minutes, more preferably 3 to 9 minutes, and particularly preferably 3 to 7 minutes. If the molding time is 10 minutes or less, low energy consumption is achieved because of non-excessive time, and also the wood-based material is scarcely degraded. If the molding time is 3 minutes or more, an appropriate bonding time is secured, and thus which makes it possible to secure appropriate bonding.

The wood-based material thus obtained in the above-mentioned manner can be used for various applications, for example, building materials, furniture, and so on, like a conventional wood-based material.

EXAMPLES

The present invention will be described below by way of Examples and Comparative Examples. It should be noted, however, these Examples are intended to describe the present invention and the present invention is not limited thereto.

The following components were prepared as components of an aqueous bonding composition. Trade name and manufacturer's name are shown in parentheses. Parts are by weight.

<(A) Saccharide>
 (A-1) Sucrose (Wako Pure Chemical Industries, Ltd.)
 (A-2) Fructose (Wako Pure Chemical Industries, Ltd.)
 (A-3) Inulin (manufactured by Fuji nihon seito Corporation, Fuji FFSC (trade name))
<(B) Inorganic Acid Ammonium Salt>
 (B-1) Ammonium dihydrogen phosphate (Wako Pure Chemical Industries, Ltd.)
 (B-2) Ammonium hydrogen phosphate (Wako Pure Chemical Industries, Ltd.)
 (B-3) Ammonium sulfate (Wako Pure Chemical Industries, Ltd.)
 (B'-4) Ammonium acetate (Wako Pure Chemical Industries, Ltd.)
<(C) Metal Salt>
 (C-1) Magnesium chloride (Wako Pure Chemical Industries, Ltd.)
 (C-2) Magnesium sulfate (Wako Pure Chemical Industries, Ltd.)
 (C-3) Sodium chloride (Wako Pure Chemical Industries, Ltd.)

Aqueous bonding composition of Examples 1 to 13 were produced in the following manner.

Example 1: Production of Aqueous Bonding Composition 72.7 Parts of (A-1) sucrose (Wako Pure Chemical Industries, Ltd.), 18.2 parts of (B-1) ammonium dihydrogen phosphate (Wako Pure Chemical Industries, Ltd.), and 9.1 parts of (C-1) magnesium chloride (Wako Pure Chemical Industries, Ltd.) were added to 100 parts of distilled water, followed by dissolving with stirring at normal temperature to obtain an aqueous bonding composition of Example 1. The composition of the aqueous bonding composition of Example 1 is shown in Table 1.

Examples 2 to 13 and Comparative Examples 14 to 18: Production of Aqueous Bonding Composition The composition of each of aqueous bonding compositions of Examples 2 to 13 and Comparative Examples 14 to 18 is shown in Tables 1 to 3.

In the same manner as in Example 1, except that the components (A), (B), and (C) used in Example 1 were changed to components shown in Tables 1 to 3 and amounts thereof, the aqueous bonding compositions of Examples 2 to 13 and Comparative Examples 14 to 18 were produced.

The aqueous bonding composition of the composition (Comparative Example) 17 was produced by adding 15.0 parts of (B-1) to 100 parts of distilled water. Therefore, the addition is mentioned in Table 3 in that way. In the composition 17 in Table 3, no components (A) and (C) are added.

TABLE 1

| Composition | | (Example) | | | | | | |
|---|---|---|---|---|---|---|---|---|
| | | 1 | 2 | 3 | 4 | 5 | 6 | 7 |
| (A) | (A-1) | 72.7 | 76.2 | 78.2 | 80.0 | 84.2 | 68.1 | 61.6 |
| | (A-2) | | | | | | | |
| | (A-3) | | | | | | | |
| (B) | (B-1) | 18.2 | 19.0 | 19.5 | 10.0 | 5.3 | 21.3 | 25.6 |
| | (B-2) | | | | | | | |
| | (B-3) | | | | | | | |
| | (B'-4) | | | | | | | |
| (C) | (C-1) | 9.1 | 4.8 | 2.3 | 10.0 | 10.5 | 10.6 | 12.8 |
| | (C-2) | | | | | | | |
| | (C-3) | | | | | | | |
| Water | | 100 | 100 | 100 | 100 | 100 | 100 | 100 |

TABLE 2

| Composition | | (Example) | | | | | |
|---|---|---|---|---|---|---|---|
| | | 8 | 9 | 10 | 11 | 12 | 13 |
| (A) | (A-1) | | | 72.7 | 72.7 | 72.7 | 72.7 |
| | (A-2) | 72.7 | | | | | |
| | (A-3) | | 72.7 | | | | |
| (B) | (B-1) | 18.2 | 18.2 | | | 18.2 | 18.2 |
| | (B-2) | | | 18.2 | | | |
| | (B-3) | | | | 18.2 | | |
| | (B'-4) | | | | | | |
| (C) | (C-1) | 9.1 | 9.1 | 9.1 | 9.1 | | |
| | (C-2) | | | | | 9.1 | |
| | (C-3) | | | | | | 9.1 |
| Water | | 100 | 100 | 100 | 100 | 100 | 100 |

TABLE 3

| Composition | | (Comparative Example) | | | | |
|---|---|---|---|---|---|---|
| | | 14 | 15 | 16 | 17 | 18 |
| (A) | (A-1) | 100 | 80.0 | 80.0 | | 72.7 |
| | (A-2) | | | | | |
| | (A-3) | | | | | |
| (B) | (B-1) | | 20.0 | | 15.0 | |
| | (B-2) | | | | | |
| | (B-3) | | | | | |
| | (B'-4) | | | | | 18.2 |
| (C) | (C-1) | | | 20.0 | | 9.1 |
| | (C-2) | | | | | |
| | (C-3) | | | | | |
| Water | | 100 | 100 | 100 | 100 | 100 |

Using the above-mentioned aqueous bonding compositions of Examples 1 to 13 and Comparative Examples 14 to 18, wood-based materials (particle boards) of Examples 19 to 35 and Comparative Examples 36 to 42 were produced.

Example 19: Production of Wood-Based Material

Wood-based fibers of coniferous tree, which passed through a 60 mesh sieve, were used as a wood-based element (raw material). The aqueous adhesive composition of Example 1 was uniformly applied onto 72 parts of the wood-based element using a spray so that the solid content became 28 parts. The coated wood-based element was dried in an oven at 80° C. for 2 hours. After press molding at a heating platen temperature of 170° C. under a pressure of 4 MPa for 9 minutes, a wood-based material (particle board) having a thickness of 9 mm and a density of 0.8 g/cm$^3$ of Example 19 was produced. The composition and manufacturing conditions used in Example 19 are shown in Table 4.

Examples 20 to 35 and Comparative Examples 36 to 42: Production of Wood-Based Material The composition and manufacturing condition used to produce particle boards of Examples 20 to 35 and Comparative Examples 36 to 42 are shown in Tables 4 to 6.

In the same manner as in Example 19, except that the aqueous adhesive composition used in Example 19, the amount thereof, the amount of the wood-based element, and press molding conditions (heating platen temperature, pressure, and molding time) were changed to the values shown in Tables 4 to 6, wood-based materials (particle boards) of Example 20 to 35 and Comparative Example 36 to 42 were produced. Other conditions such as size and density of each particle board are the same as those of the particle board of Example 19.

Regarding the particle boards thus obtained, the respective bending strength (N/mm$^2$), bending strength under wet condition (B test) (N/mm$^2$), water-absorption thickness expansion coefficient (%), and peeling strength (N/mm$^2$) were measured in accordance with JISA5908:2003.

The above-mentioned particle board corresponds to a "non-polished board" of a "base particle board" disclosed in JISA5908:2003. "Bending strength(s)" in a width direction is almost the same as that in a length direction, and the smaller value was employed as the results of the "bending strength" and the "bending strength under wet condition".

The "bending strength (N/mm$^2$)" is preferably 8.0 or more, more preferably 13.0 or more, and particularly preferably 18.0 or more.

The "bending strength under wet condition (N/mm$^2$)" is preferably 6.5 or more, and more preferably 9.0 or more.

The "water-absorption thickness expansion coefficient (%)" is preferably 12 or less.

The "peeling strength (N/mm$^2$)" is preferably 0.15 or more, more preferably 0.2 or more, and particularly preferably 0.3 or more.

TABLE 4

| | | | (Example) | | | | | | | | |
|---|---|---|---|---|---|---|---|---|---|---|---|
| Wood-based material | | | 19 | 20 | 21 | 22 | 23 | 24 | 25 | 26 | 27 |
| Composition | Wood-based element | Parts by weight | 72 | 80 | 82 | 72 | 72 | 72 | 72 | 72 | 72 |
| | Bonding composition | (Example) | 1 | 1 | 1 | 1 | 1 | 2 | 3 | 4 | 5 |
| | | Parts by weight | 28 | 20 | 18 | 28 | 28 | 28 | 28 | 28 | 28 |

TABLE 4-continued

|  |  |  | (Example) | | | | | | | | |
|---|---|---|---|---|---|---|---|---|---|---|---|
| Wood-based material | | | 19 | 20 | 21 | 22 | 23 | 24 | 25 | 26 | 27 |
| Molding conditions | Temperature | °C. | 170 | 170 | 170 | 140 | 170 | 170 | 170 | 170 | 170 |
| | Time | Minutes | 9 | 9 | 9 | 9 | 5 | 9 | 9 | 9 | 9 |
| | Pressure | MPa | 4 | 4 | 4 | 4 | 4 | 4 | 4 | 4 | 4 |
| Performances | Bending strength (N/mm$^2$) | | 15 | 15 | 14 | 20 | 21.6 | 19 | 21.6 | 13 | 14.3 |
| | Bending strength under wet condition (N/mm$^2$) | | 9.3 | 8.8 | 8.2 | 6.9 | 7.8 | 10.5 | 10.7 | 8.5 | 6.6 |
| | Water-absorption thickness expansion coefficient (%) | | 2.4 | 6.8 | 11.0 | 8.1 | 3.1 | 7.8 | 6.8 | 9.3 | 7.5 |
| | Peeling strength (N/mm$^2$) | | 1.3 | 1.0 | 1.4 | 1.5 | 1.3 | 0.8 | 1.6 | 0.9 | 1.2 |

TABLE 5

|  |  |  | (Example) | | | | | | | |
|---|---|---|---|---|---|---|---|---|---|---|
| Wood-based material | | | 28 | 29 | 30 | 31 | 32 | 33 | 34 | 35 |
| Composition | Wood-based element | Parts by weight | 72 | 72 | 72 | 72 | 72 | 72 | 72 | 72 |
| | Bonding composition | (Example) | 6 | 7 | 8 | 9 | 10 | 11 | 12 | 13 |
| | | Parts by weight | 28 | 28 | 28 | 28 | 28 | 28 | 28 | 28 |
| Molding conditions | Temperature | °C. | 170 | 170 | 170 | 170 | 170 | 170 | 170 | 170 |
| | Time | Minutes | 9 | 9 | 9 | 9 | 9 | 9 | 9 | 9 |
| | Pressure | MPa | 4 | 4 | 4 | 4 | 4 | 4 | 4 | 4 |
| Performances | Bending strength (N/mm$^2$) | | 20.5 | 19 | 24.0 | 22.5 | 21.2 | 18.8 | 27.1 | 18 |
| | Bending strength under wet condition (N/mm$^2$) | | 7.6 | 7.0 | 9.0 | 12.4 | 8.7 | 9.3 | 11.9 | 8.2 |
| | Water-absorption thickness expansion coefficient (%) | | 2.7 | 2.9 | 3.0 | 2.9 | 3.9 | 3.1 | 6.9 | 4.8 |
| | Peeling strength (N/mm$^2$) | | 1.3 | 1.0 | 1.3 | 1.4 | 1.3 | 1.5 | 1.8 | 1.1 |

TABLE 6

|  |  |  | (Comparative Example) | | | | | | |
|---|---|---|---|---|---|---|---|---|---|
| Wood-based material | | | 36 | 37 | 38 | 39 | 40 | 41 | 42 |
| Composition | Wood-based element | Parts by weight | 75 | 80 | 72 | 72 | 72 | 94 | 72 |
| | Bonding composition | (Comparative Example) | 14 | 15 | 15 | 15 | 16 | 17 | 18 |
| | | Parts by weight | 25 | 20 | 28 | 28 | 28 | 6 | 28 |
| Molding conditions | Temperature | °C. | 170 | 170 | 140 | 170 | 170 | 170 | 170 |
| | Time | Minutes | 9 | 9 | 9 | 5 | 9 | 9 | 9 |
| | Pressure | MPa | 4 | 4 | 4 | 4 | 4 | 4 | 4 |
| Performances | Bending strength (N/mm$^2$) | | 13 | 19 | 14 | 19 | 19 | 1 | 15 |
| | Bending strength under wet condition (N/mm$^2$) | | * | 3.5 | * | * | ** | * | 0.8 |
| | Water-absorption thickness expansion coefficient (%) | | * | 20.4 | 50.1 | 35.0 | 17.0 | * | 34.2 |
| | Peeling strength (N/mm$^2$) | | 0.2 | 1.4 | 0.3 | 0.5 | 0.9 | 0.02 | 0.4 |

\* indicates "collapse": The wood-based material was broken, so that it cannot maintain the form wholly during the evaluation.
\*\* indicates "partial collapse": The wood-based material was partially broken, so that it cannot maintain the half of the form during the evaluation.

As shown in Tables 4 and 5, the wood-based materials of Examples 19 to 35 produced by using the aqueous bonding compositions of Examples 1 to 13 were excellent in bending strength, bending strength under wet condition, and peeling strength, and exhibited a small water-absorption thickness expansion coefficient, regardless of being molded at comparatively low temperature of 170° C. These wood-based materials were also excellent in balance among these performances. Therefore, the bonding composition according to the present invention can be suitably used and applied to a wood-based element to produce a wood-based material.

To the contrary, as shown in Table 6, wood-based materials produced by using the aqueous bonding compositions of Comparative Examples 14 to 18 have problems with regard to any one of bending strength, bending strength under wet condition, peeling strength, and water-absorption thickness expansion coefficient detachability. These wood-based materials are particularly inferior in performances under wet condition. Therefore, the bonding compositions of Comparative Examples are unsatisfactory to produce the wood-based materials.

These results revealed that the aqueous bonding composition comprising the above-mentioned three components (A) to (C) is useful to bond a wood-based element (raw material), and an excellent wood-based material can be molded by molding a wood-based element using the same.

The present invention can provide an aqueous bonding composition which is useful for bonding a wood-based element. A wood-based material can be suitably produced by molding a wood-based element using the aqueous bonding composition according to the present invention.

We claim:

1. An aqueous bonding composition consisting essentially of:
   (A) a saccharide;
   (B) an inorganic acid ammonium salt; and
   (C) a metal salt that is potassium sulfate, sodium chloride, magnesium sulfate or magnesium chloride wherein the aqueous bonding composition is characterized as having a cure profile of 140 to 170° C., 0.5 to 6.0 MPa for 3 to 7 minutes.

2. The aqueous bonding composition according to claim 1, wherein the metal salt (C) is sodium chloride, magnesium sulfate or magnesium chloride.

3. The aqueous bonding composition according to claim 2, wherein the metal salt (C) is magnesium chloride.

4. The aqueous bonding composition according to claim 1, wherein the saccharide (A) comprises a structure derived from fructose.

5. The aqueous bonding composition according to claim 1, wherein the inorganic acid ammonium salt (B) comprises at least one selected from ammonium hydrogen phosphate, ammonium dihydrogen phosphate, ammonium sulfate, and ammonium chloride.

6. A wood-based material coated with the aqueous bonding composition according to claim 1.

7. The aqueous bonding composition according to claim 1, consisting essentially of 20-95 parts by weight of the saccharide (A), 1-50 parts by weight of the inorganic ammonium salt (B), and 0.5-50 parts by weight of the metal salt (C), based on 100 parts by weight of the total amount of components (A), (B), and (C).

8. The aqueous bonding composition according to claim 1, consisting essentially of 60-85 parts by weight of the saccharide (A), 2-25 parts by weight of the inorganic ammonium salt (B), and 2-15 parts by weight of the metal salt (C), based on 100 parts by weight of the total amount of components (A), (B), and (C).

* * * * *